US010165175B2

(12) United States Patent
Kondo (10) Patent No.: US 10,165,175 B2
(45) Date of Patent: Dec. 25, 2018

(54) ELECTRONIC DEVICE AND METHOD FOR CONTROLLING THE SAME

(71) Applicant: CANON KABUSHIKI KAISHA, Tokyo (JP)

(72) Inventor: Emi Kondo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 211 days.

(21) Appl. No.: 15/012,320

(22) Filed: Feb. 1, 2016

(65) Prior Publication Data
US 2016/0224225 A1  Aug. 4, 2016

(30) Foreign Application Priority Data
Feb. 4, 2015  (JP) .................................. 2015-020641

(51) Int. Cl.
H04N 5/232 (2006.01)
G06F 3/0481 (2013.01)
G06F 3/0482 (2013.01)

(52) U.S. Cl.
CPC ....... H04N 5/23216 (2013.01); G06F 3/0482 (2013.01); G06F 3/04817 (2013.01); H04N 5/23293 (2013.01)

(58) Field of Classification Search
CPC ............ H04N 5/23216; H04N 5/23293; G06F 3/04817; G06F 3/0482; G06F 3/04845
See application file for complete search history.

(56) References Cited

U.S. PATENT DOCUMENTS

2012/0179988 A1* 7/2012 Suh ..................... G06F 3/04892
                                                          715/767
2013/0163023 A1* 6/2013 Tomono ............. H04N 1/00392
                                                          358/1.13
2014/0078370 A1   3/2014 Yoshimi

FOREIGN PATENT DOCUMENTS

| CN | 102215374 A | 10/2011 |
|----|-------------|---------|
| JP | H06-079073 A | 3/1994 |
| JP | H11-126059 A | 5/1999 |
| JP | 2008-071165 A | 3/2008 |

* cited by examiner

Primary Examiner — Jeffrey A Gaffin
Assistant Examiner — Ayesha E Huertas Torres
(74) Attorney, Agent, or Firm — Canon U.S.A., Inc. IP Division (57) ABSTRACT

An electronic device includes a control unit and an acceptance unit to accept an operation to move a selected location on a screen in which items are positioned. When moving a particular item not located in a first direction at an end of selectable locations, the particular item is moved in the first direction. Where the particular item is located in the first direction at the end of the selectable locations, the particular item is not moved. In response to selecting a selectable locations without moving any item, a selected location is moved to a location in the first direction from the location being currently selected. Where the location in the first direction being currently selected is at the end of the selectable locations, the selected location is moved, in a direction opposite the first direction, from the location being currently selected to a location at a selectable locations end.

18 Claims, 9 Drawing Sheets

ELECTRONIC DEVICE AND METHOD FOR CONTROLLING THE SAME

BACKGROUND OF THE INVENTION

Field of the Invention

The present disclosure relates to a technique to perform an operation on a display unit to make a selection or the like.

Description of the Related Art

Many techniques have been proposed as to an improvement in operability in selecting one or more items from a plurality of items.

Japanese Patent Laid-Open No. 2008-71165 discloses a method of performing a moving operation in a case where an item, at an end of items arranged in a row, is selected by performing a sequence of operations using a rotary part. In this technique, in a case where the movement operation is still being continued after an item at an end is selected, the item at this end remains selected without selecting an item at the opposite end. After the selecting the item at the end in the movement operation is finished once, the same movement operation is performed again, the item at the opposite end is selected.

Japanese Patent Laid-Open No. 6-79073 discloses a method of performing a moving operation such that when one of a plurality of items is selected by using a dial, if there are a small number of items that can be selection candidates, then even when an operation of selecting an item at an end is still being continued after this item is selected, an item at the opposite end is not selected. On the other hand, in a case where there are many items that can be selection candidates, if an operation of selecting an item at an end is still being continued after this item is selected, an item at the opposite end is selected.

One example of a movement operation is that performed to select a desired item. Another example is a movement operation performed to select a desired location such as that performed to select a location where a selected item is to be placed.

In the movement operation to reach a desired item, when it is tried to select an item at an end opposite to an end being currently selected, it is necessary to again perform a movement operation to select the item at the opposite from the current end as described in Japanese Patent Laid-Open No. 2008-71165, which causes an increase in the number of necessary operation steps. On the other hand, in the movement operation to select a desired location, in a case where there are many items as is the case described in Japanese Patent Laid-Open No. 6-79073, if an end is selected that is opposite to an end close to a desired location intended to be selected, the resultant selected location is far away from the intended location.

SUMMARY OF THE INVENTION

In view of the above, the present disclosure provides an electronic device that allows it to easily perform a movement operation to reach a location to be selected on a screen depending on a purpose for the location movement.

In an aspect of the present disclosure, an electronic device includes an acceptance unit configured to accept an operation, including a first movement operation, to move a selected location on a screen in which one or more items are positioned, and a control unit configured to perform a control operation, wherein, in response to performing the first movement operation to move a particular item, in a case where the particular item is not located in a first direction at an end of a plurality of selectable locations, the particular item is moved in the first direction, while, in a case where the particular item is located in the first direction at the end of the plurality of selectable locations, the particular item is not moved, even if the first movement operation is performed to try to move the particular item, and wherein, in response to performing the first movement operation to select one of a plurality of selectable locations without moving any item, in a case where a location being currently selected is one of the plurality of selectable locations in the first direction other than the end of the plurality of selectable locations, a selected location is moved to a location in the first direction from the location being currently selected, while, in a case where the location in the first direction being currently selected is at the end of the plurality of selectable locations, the selected location is moved, in a second direction opposite to the first direction, from the location being currently selected to a location at an end of the plurality of selectable locations.

Further features of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

The present disclosure provides a technique that allows it to easily perform a movement operation to reach a location to be selected on a screen.

Embodiments of the present disclosure are described below with reference to accompanying drawings.

Figure 1A:
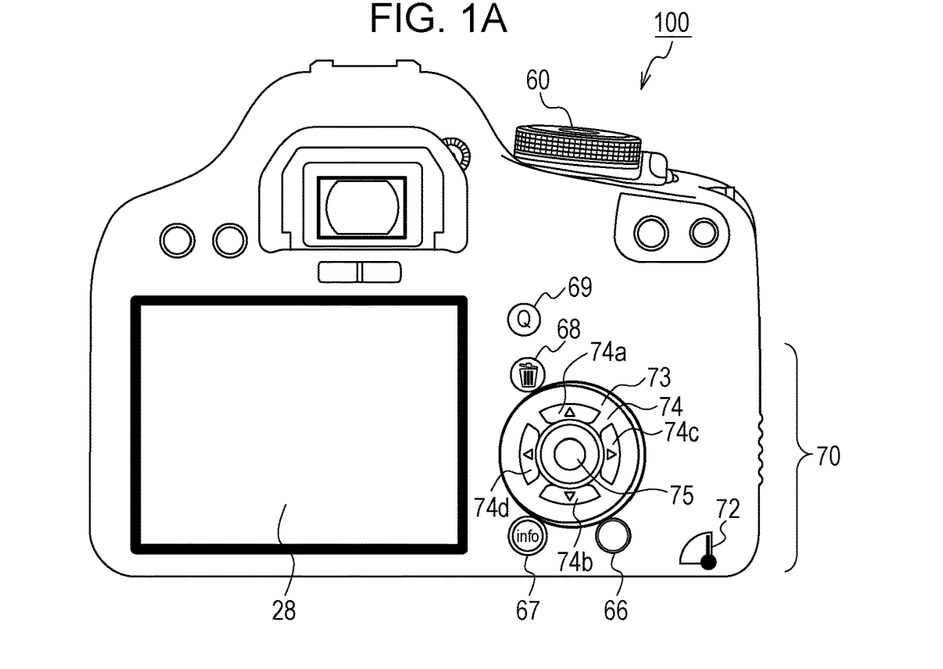
FIGS. 1A and 1B are appearance diagrams of a digital camera, which is an example of an apparatus having a configuration according to an embodiment.
Figure 1B:
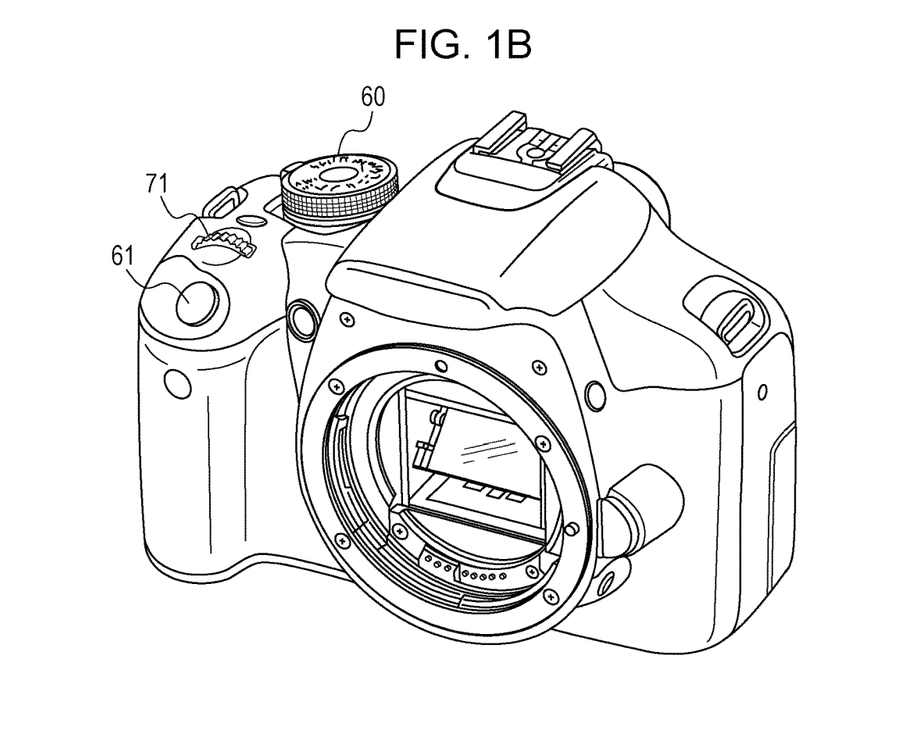

FIGS. 1A and 1B are appearance diagrams of a digital camera, which is an example of an image pickup apparatus according to an embodiment. FIG. 1A is a back view of the digital camera 100, and FIG. 1B is a front perspective view of the digital camera 100. In FIG. 1, a display unit 28 is a display unit configured to display an image and various kinds of information. A shutter button 61 is an operation part for issuing an image capture command. A mode selection switch 60 is an operation part for selecting a mode from various modes. A main electronic dial 71 is a rotary operation part included in an operation unit 70. By rotating this main electronic dial 71, it is allowed to change a set value in terms of a shutter speed, an aperture, or the like. The main electronic dial 71 is also used to switch an item to be selected (a selection item is sequentially changed). A power switch 72 is an operation part for switching on/off electric power of the digital camera 100. A sub-electronic dial 73 is a rotary operation part included in the operation unit 70 and is used to move a selection frame or change an image. An arrow key set 74 is a part of the operation unit 70 and includes an up-arrow key 74a, a down-arrow key 74b, a right-arrow key 74c, and a left-arrow key 74d, which are respectively located at an upper, bottom, left, and right portions and which are configured to be capable of being pushed down. If an arrow key is pressed down to change a selected item from a plurality of items, an item located in a direction corresponding to the pressed arrow key is selected instead of the item being currently selected.

A set button 75 is a push button included in the operation unit 70, and is mainly used to complete the setting of the item.

A menu button 66 is a button to display a menu screen. This bottom is also used to return to a previous screen from a screen being currently displayed. In the present embodiment, when the menu button 66 is pressed down, an operation of laying out items using a quick customization screen (hereinafter, referred to as a Q customization screen) is ended, and the item layout set using the Q customization screen is employed in a user quick setting screen (hereinafter referred to as a user Q screen).

An INFO button 67 is a button for displaying information related to the screen being displayed. In the Q customization screen, the INFO button 67 functions as a button for accepting a change in size of an item being selected. If the INFO button 67 is pressed down, a screen appears that allows it to change the size of the item being selected.

A delete button 68 is a button for deleting an image being displayed. In the Q customization screen, the delete button 68 receives a request for deleting an item at a position being selected.

A quick (Q) button 69 is a button for displaying a quick screen (hereinafter referred to as a Q screen) which is not a screen set by a user but a screen prepared as a default screen) or a user Q screen. Note that in the Q customization screen, the Q button 69 functions as a button for adding an additional item to the Q customization screen. If the Q button 69 is pressed down, a screen appears that allows it to select an item. After an item is selected, if the screen is returned to the Q customization screen, the selected item is displayed at the location selected when the Q button 69 is pressed down.

Although not shown in FIGS. 1A and 1B, it is allowed to attach a lens to the digital camera 100.

Figure 2:
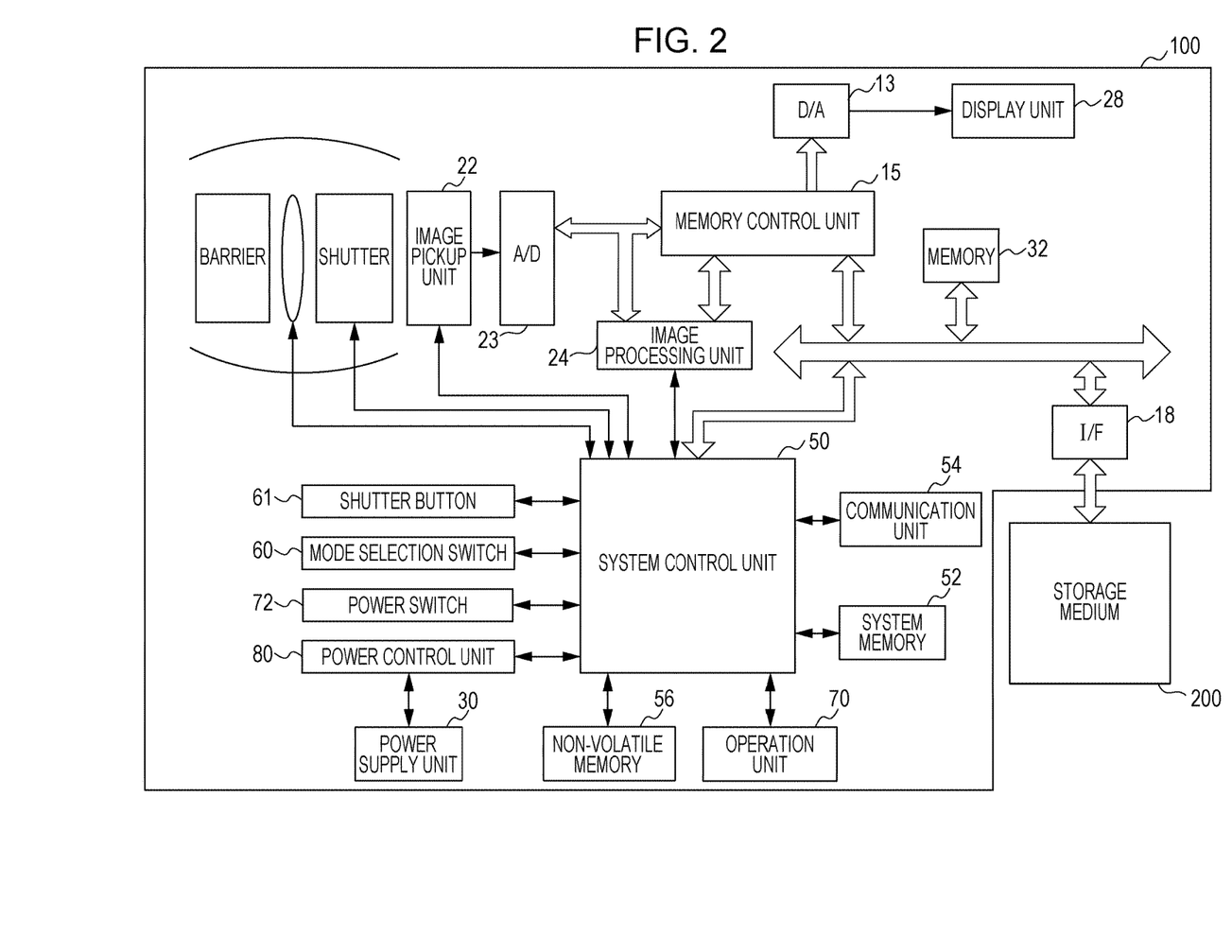
FIG. 2 is a block diagram illustrating an example of a configuration of a digital camera, which is an example of an apparatus according to an embodiment.

FIG. 2 is a block diagram illustrating an example of a hardware configuration of the digital camera 100 according to the present embodiment.

In a state in which a lens is attached to the digital camera 100, an image pickup unit 22 includes an image sensor such as a CCD sensor, a CMOS sensor, or the like configured to convert an optical image to an electric signal. An analog-to-digital converter 23 converts an analog signal to a digital signal. The analog-to-digital converter 23 is used to convert an analog signal output from the image pickup unit 22 to a digital signal.

An image processing unit 24 performs image processing including a pixel interpolation process, a resizing process such as a reduction process, a color conversion process, and/or the like on data output from the analog-to-digital converter 23 or data output from a memory control unit 15. The image processing unit 24 also performs a particular calculation process using captured image data. Based on a resultant calculation result, a system control unit 50 performs an exposure control and a distance measurement process. This allows it to achieve a TTL (through the lens) AF (auto focus) process, an AE (auto exposure control) process, and an EF operation (pre-flash operation). The image processing unit 24 also performs a particular calculation process using captured image data and, based on a resultant calculation result, performs a TTL AWB (auto white balance) process.

Data output from the analog-to-digital converter 23 is written in a memory 32 via the image processing unit 24 and the memory control unit 15, or directly written via the memory control unit 15. The memory 32 stores image data obtained by converting image data output from the image pickup unit 22 into digital form by the analog-to-digital converter 23, or stores image data to be displayed on the display unit 28. The memory 32 has a storage capacity large enough to store a predetermined number of still images, a moving image and audio data with a predetermined length.

Note that the memory 32 also functions as a memory (a video memory) for use in displaying an image. A digital-to-analog converter 13 converts the data used in displaying an image stored in the memory 32 to an analog signal and supplies the resultant analog signal to the display unit 28. Thus, the image display data stored in the memory 32 is displayed on the display unit 28 via the digital-to-analog converter 13. The display unit 28 performs displaying on a display device such as an LCD device or the like in accordance with the analog signal supplied from the digital-to-analog converter 13. Thus, the analog signal output from the image pickup unit 22 is once converted to the digital signal by the analog-to-digital converter 23 and stored in the memory 32, and the digital signal in the memory 32 is again converted to the analog signal by the digital-to-analog converter 13 and is sequentially transferred to the display unit 28 and displayed thereon. As a result, a function of an electronic viewfinder is achieved. Thus, it is possible to display a through image (live view image).

A nonvolatile memory 56 is a memory functioning as an electrically erasable and recordable storage medium. For example, an EEPROM (Electrically Erasable Programmable Read-Only Memory) or the like may be used as the nonvolatile memory 56. In the nonvolatile memory 56, a constant used in the operation of the system control unit 50, a program, and the like are stored. Herein the program refers to a computer program for executing various processes according to the present embodiment described later with reference to flow charts.

The system control unit 50 controls the whole digital camera 100. By executing the program stored in the nonvolatile memory 56 described above, processes described below according to the present embodiment are achieved. As for a system memory 52, a RAM is used. In the system memory 52, a constant used in the operation of the system control unit 50, the program read out from the nonvolatile memory 56, and the like are loaded. The system control unit 50 also controls displaying by controlling the memory 32, the digital-to-analog converter 13, the display unit 28, and the like.

The mode selection switch 60, the shutter button 61, and the operation unit 70 are operation parts for inputting various operation instructions to the system control unit 50.

A power control unit 80 includes a battery detection circuit, a DC-DC converter, a switching circuit for selecting a block to which power is to be supplied, and the like, and is configured to make a detection in terms of whether a battery is mounted, the type of the battery, and the remaining battery capacity. Based on a result of the detection and an instruction from the system control unit 50, the power control unit 80 controls the DC-DC converter so as to supply a necessary voltage for a necessary period to various parts including the storage medium 200. The power switch 72 accepts an instruction to turn on/off the power of the digital camera 100 and notifies the system control unit 50 of the accepted instruction.

The power supply unit 30 may be realized using a primary battery such as an alkaline battery, a lithium battery, or the like, a secondary battery such as a NiCd battery, a NiMH battery, a Li battery, or the like, an AC adapter, or the like. A storage medium interface 18 is an interface with the storage medium 200 such as a memory card, a hard disk, or the like. The storage medium 200 is a storage medium for storing a captured image. The storage medium 200 may be a memory card, a semiconductor memory, an optical disk, a magnetic disk, or the like.

A communication unit 54 makes a connection to an external device or a network via a wireless or wired connection, and performs transmission/reception of an image signal, an audio signal, or the like. The communication unit 54 is also capable of making a connection with a wireless LAN (Local Area Network), the Internet, or the like. The communication unit 54 is capable of transmitting an image (including a through image) captured by the image pickup unit 22 and an image stored in the storage medium 200. The communication unit 54 is also capable of receiving image data and other various kinds of information from an external device.

In the operation of the digital camera 100, in each of modes such as an image playback mode, a wait-for-shooting mode (an image shooting mode), and the like, if the Q button 69 is pressed down, a Q (quick setting) screen is displayed on the display unit 28 to accept setting of items related to the mode. In the Q screen, items of functions or settings are displayed that are allowed to be changed. In a situation in which a button operation or a touch operation is allowed, it is possible to easily set or change an item selected by a touch operation. Therefore, it is not necessary to open a menu screen to select an item and change setting, which needs a complicated operation. The Q screen is, as described above, a screen in which items are displayed to allow a user to quickly make settings such that an item used often is displayed at a location that allows the user to more easily operate the item or to more easily check the item thereby providing an improved operability. To achieve this, a screen is displayed that allows a user to display an arbitrary item at an arbitrary location. This screen is referred to as a user Q screen. A setting operation to customize a Q screen to achieve a better usability is referred to as a Q customization operation, and a screen for use in the setting operation is referred to as a Q customization screen.

In the Q (quick) customization screen, as described above, a user is allowed to place a desired item at a desired location, and a resultant Q screen in which the item is placed in the above-described manner by the user is capable of being displayed as a user Q screen. In the Q customization, an item to be displayed on the user Q screen is selected, and then a location is selected at which the selected item is to be displayed.

The Q customization screen has a size of 4×6 (4 rows×6 columns) as illustrated in FIGS. 5A to 5D and FIGS. 6A to 6F. In the Q customization screen, the size of a placed item is not necessarily limited to 1×1, but the size may be variable. When the size of an item is changed, there is a possibility that the resultant item is placed over a plurality of rows or columns. The user Q screen will be described in further detail below with reference to FIG. 7 and FIGS. 8A to 8C.

Figure 3:
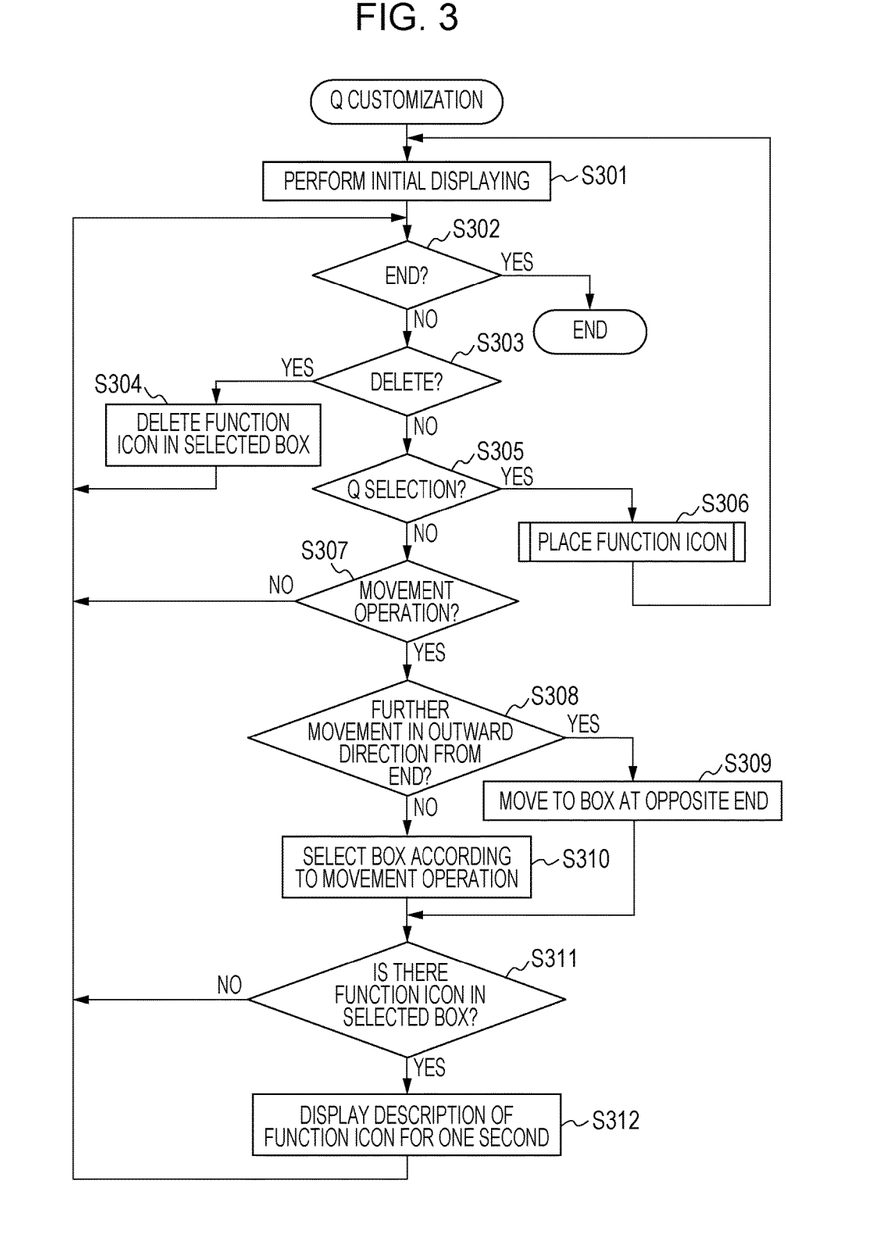
FIG. 3 is a flow chart illustrating a Q (quick) customization process.

Referring to FIG. 3, a Q customization process (a process of laying out the user Q screen) according to the present embodiment is described below. The process (the Q customization process) shown in FIG. 3 is started when setting of user Q screen is selected in a menu screen after the power of the digital camera 100 is turned on. This process is realized by loading the program stored in the nonvolatile memory 56 into the system memory 52 and executing it by the system control unit 50.

Figure 5A:
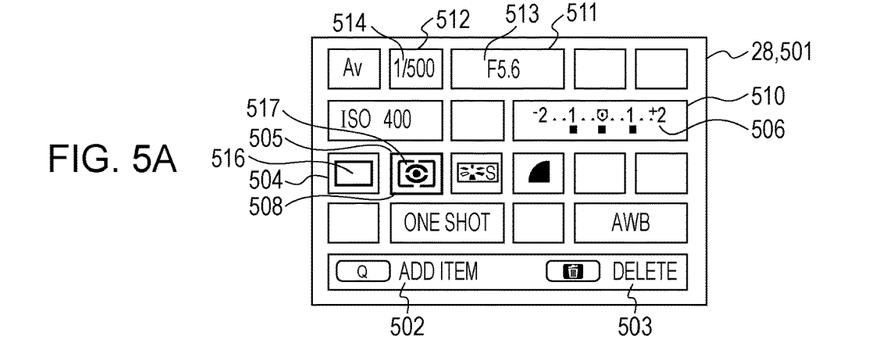
FIGS. 5A to 5D are diagrams illustrating examples of manners in which a Q customization screen is displayed in an operation of selecting a box.

In step S301, the system control unit 50 displays a Q customization screen in an initial state, such as a Q customization screen 501 shown in FIG. 5A, on the display unit 28. FIGS. 5A to 5D illustrate examples of manners in which the Q customization screen is displayed to allow it to select a position (a box). In a state in which a function icon is placed in a box, if the box (location) is selected, the function icon (item) placed in this box is selected and it is allowed to perform a process such as deleting on the selected function icon. FIG. 5A illustrates a state in which a box 505 is selected, that is, a function icon 517 placed in the box 505 is selected. An identification frame 508 is a frame (cursor) indicating a box (location, selection location) being selected. Furthermore, the system control unit 50 displays an indication item 502 and an indication item 503. The indication item 502 is an indication item displayed to notify a user that by pressing the Q button 69, it becomes possible to select an item (function icon) to be added to the Q customization screen 501 and an item to be customized is accepted. The indication item 503 is an indication item displayed to indicate that by pressing the delete button 68, it becomes possible to select an item (function icon) to be deleted. In the Q customization, as described above, in a case where there is a function icon placed in a selected box, it is allowed to delete the function icon, and it is allowed to place (or overwrite) a function icon in a selected box. That is, it is allowed to customize function icons to be displayed in the above-described manner.

In step S302, the system control unit 50 determines whether the Q customization is to be ended or not. The Q customization is ended when a command to end the Q customization is issued by pressing down the menu button 66, turning off the power of the digital camera 100, switching to a playback screen or an image screen, or the like. In a case where it is determined that the Q customization is to be ended, the displaying is ended, but otherwise the processing flow proceeds to step S303.

In step S303, the system control unit 50 determines whether the delete button 68 is pressed down. In a case where it is determined that the delete button 68 is pressed down, the processing flow proceeds to step S304, but otherwise the processing flow proceeds to step S305.

In step S304, the system control unit 50 deletes a function icon placed in a box being selected. In FIG. 5A, when the function icon 517 is in a selected state, if the delete button 68 is pressed down, the function icon 517 is deleted, and no function icon is displayed in the box 505. In a case where there is a function icon to be deleted, if the selection is moved to a box in which this function icon is located, and the delete button 68 is pressed down, the function icon placed in the box is deleted. Note that in a case where the delete button 68 is pressed down when there is no function icon placed is a selected box, nothing happens. In a case where a function icon 506 placed in a box 510 is deleted, three boxes each having a size of 1×1 are displayed at a position of the box 510. In a case where a function icon 513 placed in a box 511 is deleted, two boxes each having a size of 1×1 are displayed at a position of the box 511. In a case where a function icon 514 placed in a box 512 is deleted, one box with a size of 1×1 is displayed at a position of the box 512.

In step S305, the system control unit 50 determines whether the Q button 69 is pressed down. In a case where it is determined that the Q button 69 is pressed down, the processing flow proceeds to step S306, but otherwise the processing flow proceeds to step S307.

In step S306, the system control unit 50 performs a process of placing a function icon. The process of placing a function icon (an item laying out process) is described below with reference to a flow chart shown in FIG. 4.

In step S307, the system control unit 50 determines whether an operation of moving a selection position (position of a box) is performed by operating the arrow key set 74 or the main electronic dial 71. If it is determined that the moving operation is performed, the processing flow proceeds to step S308, but otherwise the processing flow returns to step S302. In the operation of the arrow key set 74, the selection box is switched (moved) from the box in which the currently-selected function icon is placed to a box at a position pointed to by a pressed arrow key. For example, when a move-to-right operation is performed (by pressing the right-arrow key 74c or rotating the main electronic dial 71 in a clockwise direction), the selection box (the identification frame 508 indicating the selection box) moves from the left to the right. Note that when a box at a rightmost position is in a selected state, if a move-to-right operation is further performed, a box at a leftmost position in a next row is selected. In addition, it is allowed to perform a move-to-left operation (by pressing down the left-arrow key 74d or rotating the main electronic dial 71 in a counterclockwise direction), a move-up operation (by pressing the up-arrow key 74a), and a move-down operation (by pressing down the down-arrow key 74b).

In step S308, the system control unit 50 determines whether when the movement operation in step S307 is performed in a state in which the selected box is at an end of a row or a column and a further movement in an outward direction from the end is specified by the movement operation. More specifically, an example of a further movement in an outward direction from the end of a row or column is an operation of pressing down the right-arrow key 74c or rotating the main electronic dial 71 in the clockwise direction when the selected box is at the right end in the row. Another example is an operation of pressing down the left-arrow key 74d or rotating the main electronic dial 71 in the counterclockwise direction when the selected box is at the left end of the row. An example of a further movement in an outward direction from an end of a column is an operation of pressing down the up-arrow key 74a when the selected box is at the top position in the column. Another example is an operation of pressing down the down-arrow key 74b when the selected box is at the bottom position in the column. That is, when a box being selected is at an end of a row or a column, if a further movement operation in an outward direction from an end (to the outside where there is no box) is performed, the movement operation is regarded as a move-outward-from-end operation. In a case where it is determined that a move-outward-from-end operation is performed, the processing flow proceeds to step S309, but otherwise the processing flow proceeds to step S310.

Figure 5B:
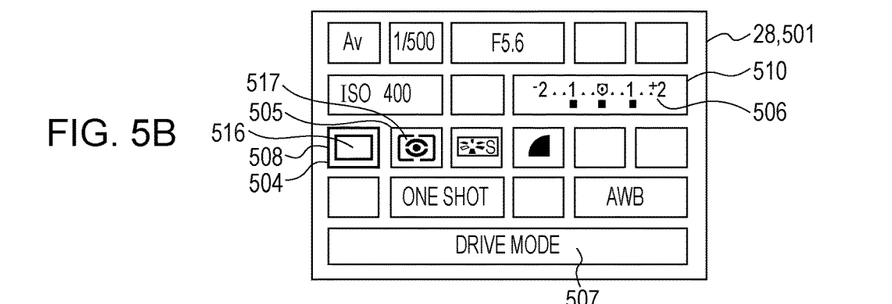
Figure 5C:
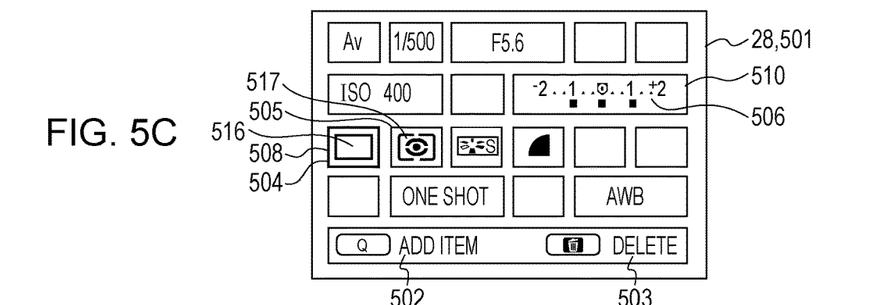
Figure 5D:
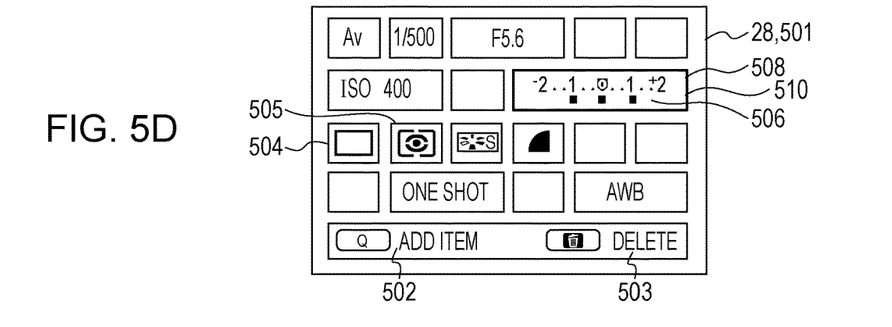

In step S309, the system control unit 50 selects a box (location) at an end that is located opposite to the end where the box (location) is currently located and that is located in an upper or lower row adjacent to the current row. Furthermore, the identification frame 508 is displayed so as enclose the selected box. Referring to FIGS. 5C and 5D, a further description is given below as to an example in which a box at the opposite end to the current end is selected. In the Q customization screen 501 in FIG. 5C, when a box 504 (a function icon 516) is selected, if a move-to-left operation is performed, a box 510 (a function icon 506) in the Q customization screen 501 as shown in FIG. 5D. Note that the function icon 506 (the box 510) is located at a right end of a row above the current row in which the function icon 516 (the box 504) is displayed. That is, when a move-to-left operation is performed at a box (a function icon) located at a left end in a current row, a box (a selectable function icon) at a right end in an upper row adjacent to the current row is selected. On the other hand, in a case where a move-to-right operation is performed at a box (a function icon) located at a right end, a box (a selectable function icon) at a left end in a next row (a lower row as seen on the screen) is selected. In a case where a move-up operation is performed at a box at the top of a column, a box at the bottom in a column on the right (as seen on the screen) is selected. In a case where a move-down operation is performed at a box at the bottom of a column, a box at the top in a next column (on the left as seen on the screen) is selected. That is, in a case where a movement in a horizontal direction is performed, a box (a selectable function icon) at the opposite end in an upper or lower row adjacent to the current row is selected. On the other hand, in a case where a movement in a vertical direction is performed, a box (a selectable function icon) at the opposite end in a column on the left side or the right side of the current column is selected. For example, to select the function icon 506 when the function icon 517 is in a selected state, the selection is achieved by performing the move-to-left operation twice, which needs a smaller number of operation steps than is needed when the selection is achieved by performing the move-to-right operation twice and further the move-up operation once. To select a particular box (a function icon placed in the box), it may be desirable to reach the particular box by performing as small a number of operation steps as possible. Thus, by allowing the movement from an end to an opposite end, it becomes possible to provide a better operability.

In step S310, the system control unit 50 selects a box (a location) corresponding to the movement operation, and displays the identification frame 508 to enclose the selected box. Thus, the function icon placed in the box is also selected. A further description is given below as to the selection of a box via the movement operation in a comparative manner with reference to FIGS. 5A and 5B. In the Q customization screen 501 in FIG. 5A, the function icon 517 (the box 505) is in a selected state. In this state, if a move-to-left operation is performed, the function icon 516 (the box 504) in the Q customization screen 501 as shown in FIG. 5B. Accordingly, the identification frame 508 is also moved from the function icon 517 to the function icon 516. As described above, a box can be selected by repeatedly performing a movement operation until the box is reached.

In step S311, the system control unit 50 determines whether there is an already existing function icon in the box selected in step S309 or step S310. In a case where it is determined that there is an already existing function icon, the processing flow proceeds to step S312, but otherwise the processing flow returns to step S302.

In step S312, the system control unit 50 displays a description 507 of the selected function icon on the display unit 28 for one second as shown in FIG. 5B. Thereafter, the system control unit 50 displays the indication item 502 and the indication item 503. FIG. 5B illustrates an example of a manner in which the Q customization screen 501 is displayed for one second after the function icon 516 is selected by the operation of moving to the left from the function icon 517. Thereafter, the Q customization screen 501 is displayed, for example, in a manner illustrated in FIG. 5C. For one second after the selection operation is performed, the description 507 is displayed on the display unit 28, as shown in FIG. 5B, to indicate that the function icon 516 being selected is an item associated with a drive mode function, but, when one second has elapsed, the description is switched to a description of an operation.

Figure 4:
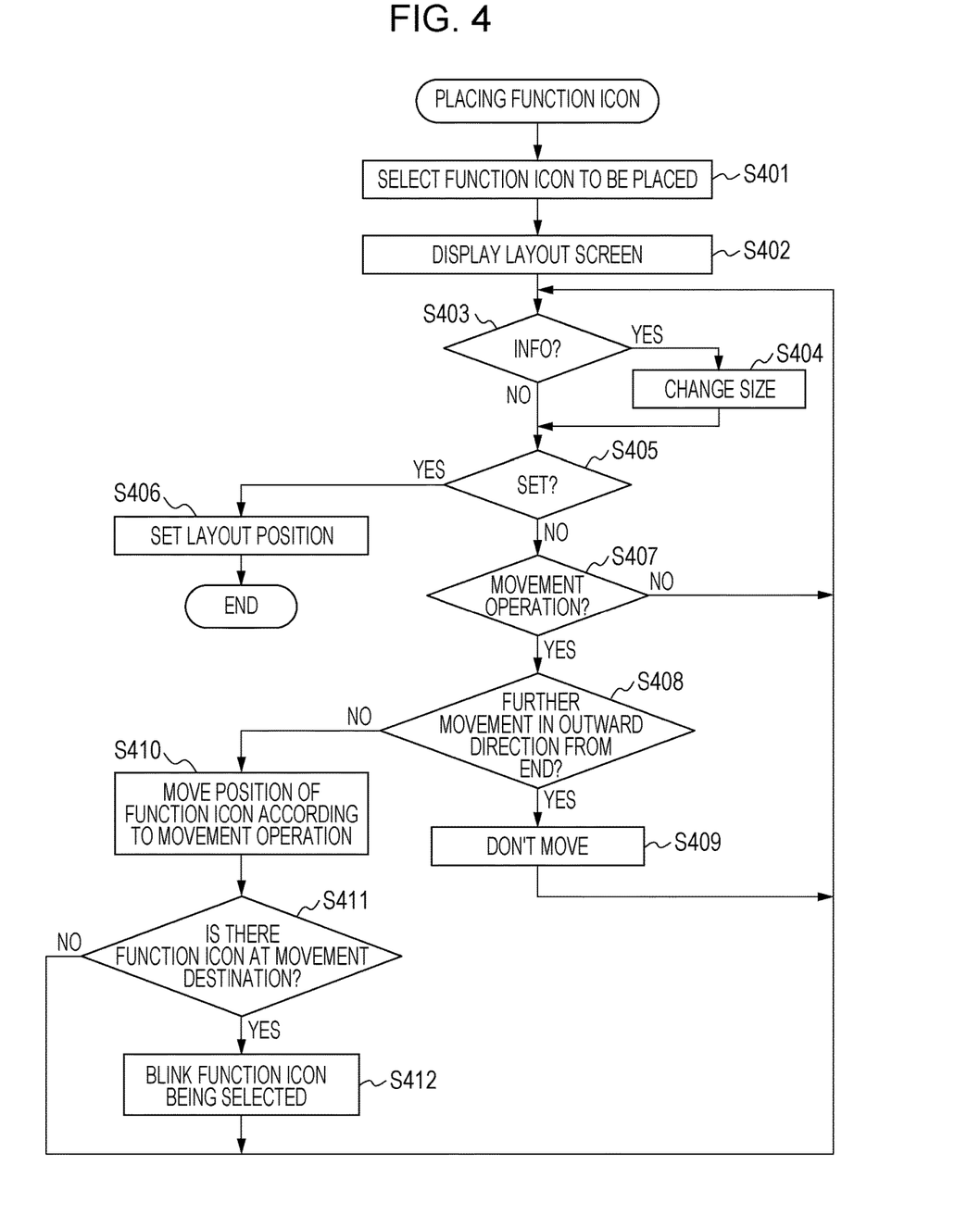
FIG. 4 is a flow chart illustrating a process of laying out a function icon.

Next, the process of placing a function icon (an item) in step S306 in FIG. 3 is described in further detail below referring to a flow chart shown in FIG. 4. This process is realized by loading the program stored in the nonvolatile memory 56 into the system memory 52 and executing it by the system control unit 50.

In step S401, the system control unit 50 accepts a user operation to select a function icon (an item) to be displayed in the user Q screen from a plurality of icons capable of being placed in the user Q screen (to determine the location at which the function icon is to be placed in the Q customization screen). The selection of the function icon may be performed on a selection screen that is displayed in response to pressing down the Q button 69 in step S305 in FIG. 3. Note that the process described in the flow chart shown in FIG. 4 is a process performed in a layout position change mode, which is one of movement operation modes and which is performed to change a layout position for a particular item. That is, in this layout position change mode, a layout position of a particular item is changed in accordance with a movement operation.

Figure 6A:
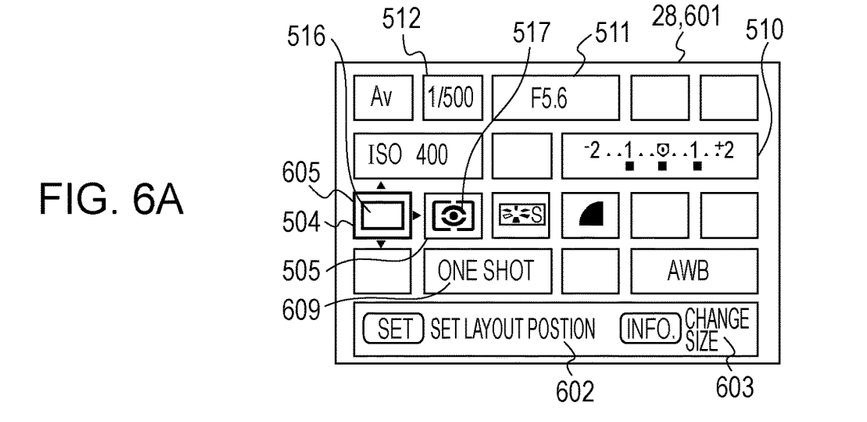
FIGS. 6A to 6F are diagrams illustrating examples of manners in which a Q customization screen is displayed in an operation of placing a function icon.

In step S402, the system control unit 50 displays a layout screen 601, such as that shown in FIG. 6A, on the display unit 28 to allow it to place a selected function icon (to move the selected function icon). FIGS. 6A to 6E illustrate examples of manners in which the layout screen 601 is displayed to allow it select a location where a selected function icon is to be placed (the selected function icon is moved to the selected location) in the Q customization screen. In FIG. 6A, the function icon 516 is enclosed in the item identification frame 605 as a result of the operation of selecting the function icon 516 in step S401, and the function icon 516 is in a state in which it is allowed to perform a movement operation on the function icon 516 (that is, it is allowed to move the function icon 516). In the state shown in FIG. 6A, the function icon 516 exists in the box 504, and three arrows, i.e., an up arrow, a down arrow, and a right arrow, accompanying the item identification frame 605 are displayed to indicate that it is allowed to move the function icon 516 from the box 504 in three directions, i.e., upward, downward, and rightward. Furthermore, an indication item 602 and an indication item 603 are displayed in the layout screen. The indication item 602 is an indication item informing a user that the layout position of a function icon is set if the set button 75 is pressed down. The indication item 603 informs that pressing down the INFO button 67 enables it change the size of a function icon subjected to the movement operation.

In step S403, the system control unit 50 determines whether or not the INFO button 67 is pressed down. In a case where it is determined that the INFO button 67 is pressed down, the processing flow proceeds to step S406, but otherwise the processing flow proceeds to step S405.

In step S404, the system control unit 50 accepts changing of the size of the function icon (the item) subjected to the movement operation. By pressing the INFO button 67, it becomes possible to change the size of a function icon subjected to the movement operation. Note that the layout position remains unchanged when the size is changed. The allowable range within which the size can be changed varies depending on the function icon.

In step S405, the system control unit 50 determines whether or not the SET button 75 is pressed down. In a case where it is determined that the SET button 75 is pressed down, the processing flow proceeds to step S406, but otherwise the processing flow proceeds to step S407.

Figure 6B:
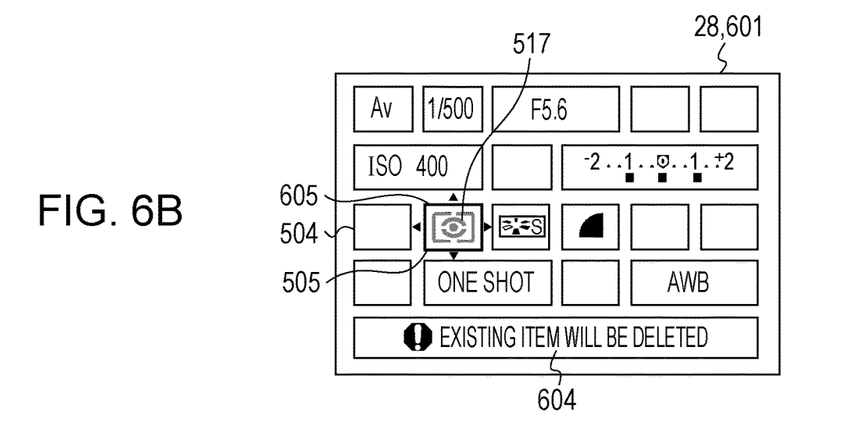
Figure 6C:
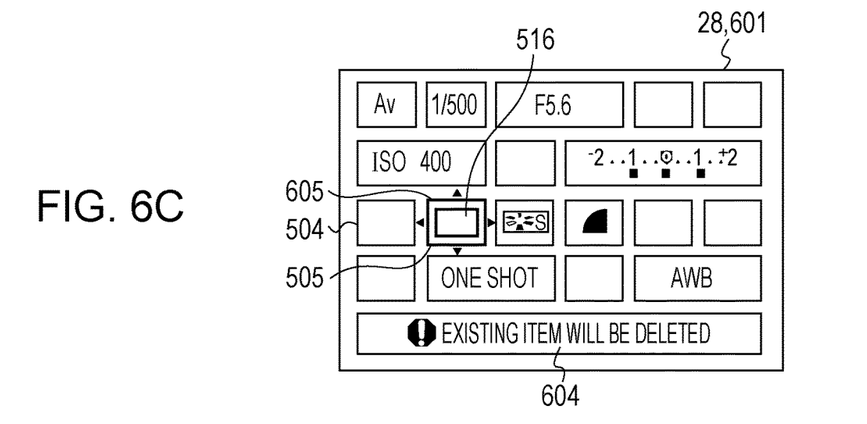
Figure 6D:
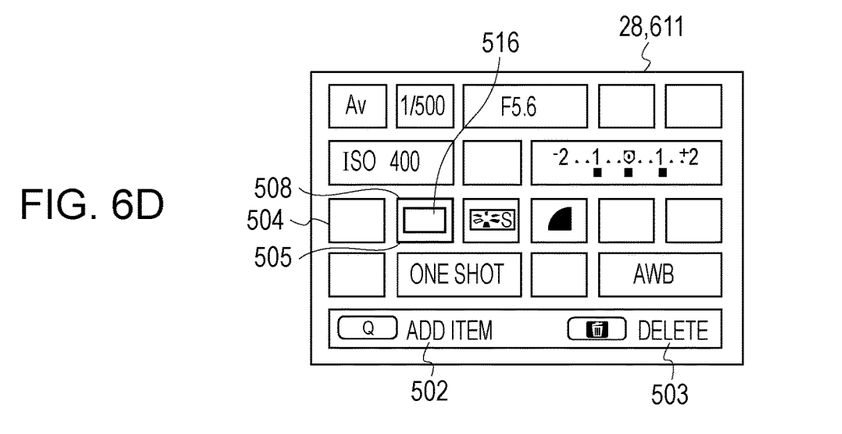

In step S406, the system control unit 50 sets the layout position for the function icon (the item) being selected. FIG. 6D illustrates a Q customization screen 611 in which the layout position of the function icon has been set. After the layout position is set, the function icon (the item) that was in the selected state before is now enclosed not in the item identification frame 605 but in the identification frame 508. Note that the movement operation is not accepted for a function icon enclosed in an identification frame 508. When the layout position of the function icon is finally set, the function icon layout process is ended, and the processing flow proceeds to step S301 in FIG. 3.

In step S407, the system control unit 50 determines whether or not an operation of moving a selected function icon is performed by operating the arrow key set 74 or the main electronic dial 71. In a case where it is determined that the movement operation is performed, the processing flow proceeds to step S408, but otherwise the processing flow returns to step S403. As described above in step S307, it is allowed to perform the movement operation in any of four directions, that is, up, down, right, and left directions. However, as described later, a move-outward-from-end operation is not accepted.

In step S408, the system control unit 50 determines that the movement operation performed in step S407 is a further movement in an outward direction from an end of a row or a column. More specifically, an example of a further movement in an outward direction from an end of a row is an operation of pressing down the right-arrow key 74c or rotating the main electronic dial 71 in the clockwise direction when the selected function icon is at the right end of the row. Another example is an operation of pressing down the left-arrow key 74d or rotating the main electronic dial 71 in the counterclockwise direction when the selected function icon is at the left end of the row. An example of a further movement in an outward direction from an end of a column is an operation of pressing down the up-arrow key 74a when the selected function icon is at the top position in the column. Another example of an operation of pressing down the down-arrow key 74b when the selected function icon is at the bottom position in the column. That is, when a function icon being selected is at an end of a row or a column, if a further movement in an outward direction from the end (to the outside where there is no box) is performed, the movement operation is regarded as a move-outward-from-end operation. In a case where it is determined that the movement operation is a move-outward-from-end operation, the processing flow proceeds to step S409, but otherwise the processing flow proceeds to step S410.

In step S409, the system control unit 50 does not move a function icon even in response to the movement operation in step S408 on the selected function. The function icon layout operation is an operation to select a location where the selected function icon is to be displayed. If the function icon is moved further in an outward direction from an end, the result is that the function icon goes away from a position intended to be selected. For example, when an operation of placing a function icon is being performed in FIG. 6A, a user is likely to be trying to place a function icon 516 in a box in a middle row or close thereto, and more specifically, in a box 504, a box 505, or other boxes located above or below. In this situation, if the user performs a move-to-left operation unintentionally, the selection moves to a box 510 at a right end which is very far from a position intended to be selected. As a result, it is necessary to perform an operation to return the selection to the original position. On the other hand, when a position close to a box 511 or a box 512 is intended to be selected, if a move-up operation is performed and as a result a box 609 at a lower position is selected against the intention, it becomes necessary to return the selection to the original position. In the cases described above, the operation is likely to be unintentional, which may cause a user to lose sight of the position of the function icon being selected. As described above, in the operation of selecting a position, there is a high probability that a user is operating close to a position intended to be selected. In view of the above, when a movement operation is performed, if the operation will cause the position to go very far from the currently selected position, the operation is not accepted.

In step S410, the system control unit 50 moves the function icon being selected in a direction corresponding to the direction of the movement operation performed in step S407. In this process, the position at which the function icon is displayed is moved according to the direction of the movement operation.

In step S411, the system control unit 50 determines whether or not there is an existing function icon in a box (location) reached as a result of the movement operation. In a case where it is determined that there is an already existing function icon, the processing flow proceeds to step S412, but otherwise the processing flow returns to step S403. FIGS. 6B and 6C illustrates manners in which a layout screen 601 is displayed for a case where there is an existing function icon 517 in a box 505 to which a function icon 516 is moved from a state shown in FIG. 6A. In a case where there is an already exiting function icon as in FIGS. 6B and 6C, the processing flow proceeds to step S412.

In step S412, the system control unit 50 displays the function icon being selected in a blinking manner at the reached location. Furthermore, the already existing function icon 517 is grayed out. That is, screens shown in FIGS. 6B and 6C are alternately displayed. Furthermore, a description 604 is displayed to inform that the function icon (the item) at the position of interest is to be deleted. If the layout is set in a state in which the function icon 517 is grayed out and the function icon 516 is displayed in black, then the function icon 517 is deleted, and, instead, the function icon 516 is placed (overwritten) in the box 505. If the process is further advanced and the set button 75 is pressed down in step S405, the function icon 516 being selected is placed in the box 505.

In the above-described manner, it is possible to select a location where a selected function icon is displayed. In a case where a there is an already existing function icon at the selected location, the already existing function icon is deleted. FIG. 6D illustrates a Q customization screen 611 in a state in which the layout position is set from the state shown in FIGS. 6B and 6C (that is, in a state in which the processing flow proceeds to step S301 in FIG. 3 from the process shown in the flow chart associated with the function icon layout). As may be seen from FIG. 6D, the function icon 516 is moved from the box 504 to the box 505 and placed therein.

Figure 6E:
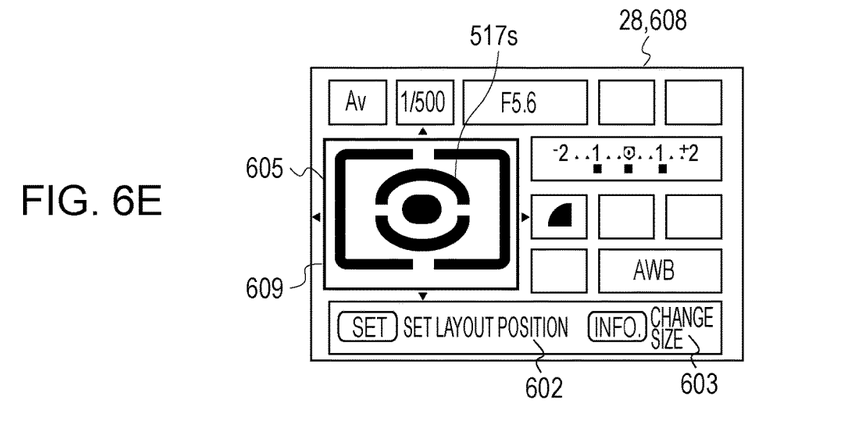
Figure 6F:
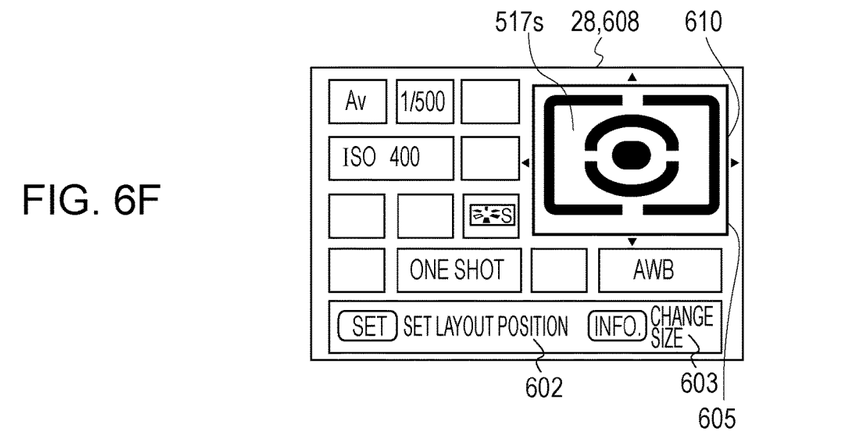

As described above, in the Q customization, it is allowed to change sizes of function icons. In a case where a function icon has a size equal to or greater than a predetermined value, a move-outward-from-end operation may not be accepted, but when a size is smaller than the predetermined value, the move-outward-from-end operation may be accepted. Referring to FIGS. 6E and 6F, a movement operation is described below for a case where the size of a function icon is changed to a value equal to or greater than the predetermined value. In FIGS. 6E and 6F, a function icon 517s in a layout screen 608 is the same icon as the function icon 517 indicating a metering mode shown in FIG. 6A to FIG. 6D, but the size thereof is different. The function icon 517 has a size of 1×1, while the function icon 517s has a size of 3×3. When the function icon 517s is located at the left end, if a move-to-left operation is performed and, thus, a movement from the left end to the right end occurs, then the selection moves from a box 609 in a layout screen 608 shown in FIG. 6E to a box 610 shown in FIG. 6F. In FIG. 6E and FIG. 6F, although the movement operation is performed to the left, the actual movement of the function icon 517s occurs to the right. In a case where a function icon has a small size, there is a large distance between an original location of the function icon and its arrival location, and, thus, it is easy for a user to perceive that the move-to-left operation performed on the function icon at the left end, where there is no more allowable position on the left side, causes the function icon to move to the right end. On the other hand, in a case where a function icon has a width corresponding to the total width of 3 boxes which is one-half the width of the Q customization screen corresponding to the total width of 6 boxes, when a move-outward-from-end operation is performed, if the actual movement occurs in a direction opposite to the specified direction, the movement in the opposite direction may cause a user to be confused. Also in the vertical movement, in a case where a function icon has a height corresponding to the total height of 2 boxes which is one-half the height of the Q customization screen having a height corresponding to the total height of 4 boxes, if an actual movement is in a direction opposite to a specified direction, a user may not understand why the movement is in the opposite direction, which may cause the user to be confused. That is, when a function icon is variable in size, there is a possibility that a movement from an end to an opposite end may cause a user to be confused depending on the size of the function icon. Therefore, when the move-outward-from-end operation is performed, the function icon is not moved. On the other hand, in a case where a movement to a particular location has been performed with no intention of moving an item (a function icon) as in the case where the movement is to select a box without moving the item, the above-described confusion does not occur even when the selected item is variable in size, and, thus, a move-outward-from-end operation is accepted.

Note that when an item is variable in size, if the length (width, height) of the item subjected to the movement is less than one-half the length (width, height), in the movement direction, of an area in which the movement is performed, a move-outward-from-end operation may be accepted because the probability is low that a user is confused. On the other hand, in a case where the width (height) of the item being selected is equal to or greater than one-half the width (height) of the area in which the movement is performed, the move-outward-from-end operation may not be accepted.

Figure 7:
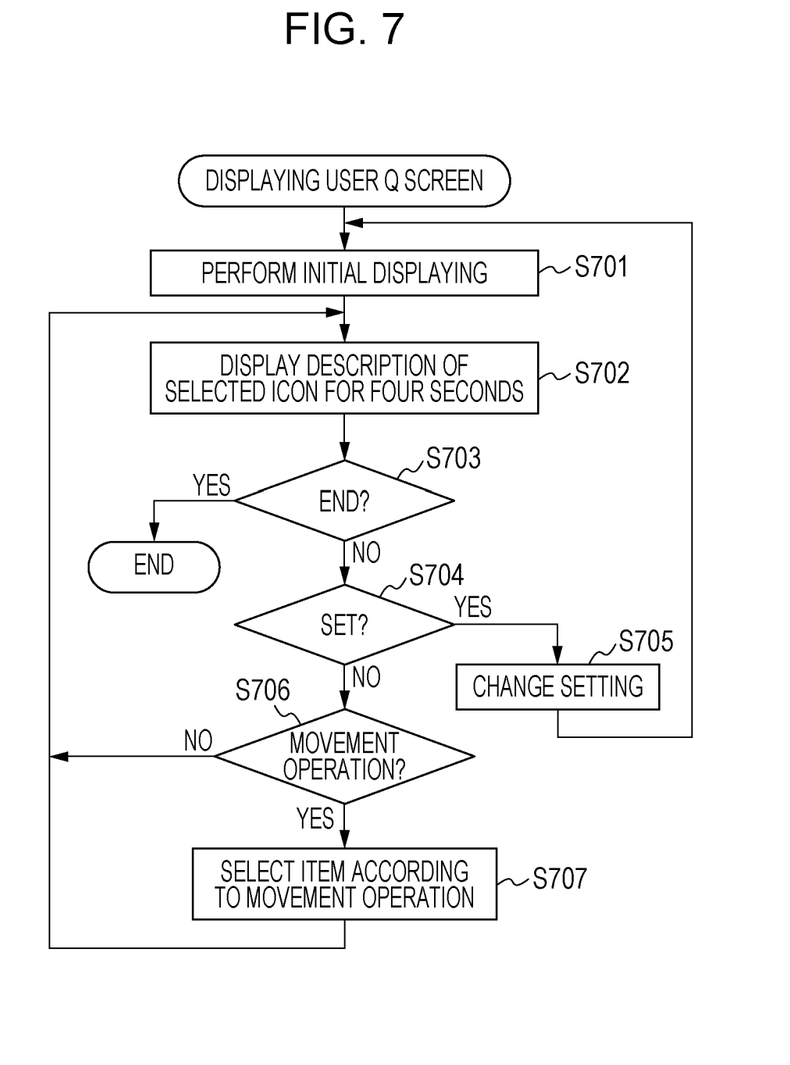
FIG. 7 is a flow chart illustrating a process of selecting an item on a user Q screen.

Next, the process of displaying a user Q screen is described in further detail below referring to a flow chart shown in FIG. 7. This process is realized by loading the program stored in the nonvolatile memory 56 into the system memory 52 and executing it by the system control unit 50.

Figure 8A:
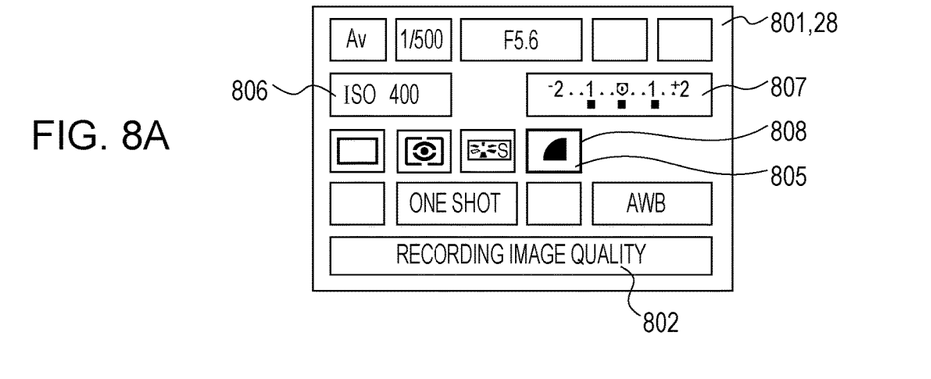
FIGS. 8A to 8C are diagrams illustrating examples of manners in which a user Q screen is displayed.

In step S701, the system control unit 50 displays a user Q screen 801, such as that shown in FIG. 8A, on the display unit 28. In the Q customization, selected items are displayed at box locations on the user Q screen. When an item indicating a function icon is selected on the user Q screen, it becomes possible to change the setting of the function. In the present example, a function icon 805 indicating recording image quality is selected on the user Q screen 801, and the function icon 805 is enclosed in an identification frame 808 so as to indicate that this item is in the selected state. The flow chart shown in FIG. 7 illustrates an operation in a function selection mode which is one of movement operation modes. In this function selection mode, it is allowed to select one of functions corresponding to an item by performing a movement operation.

Figure 8B:
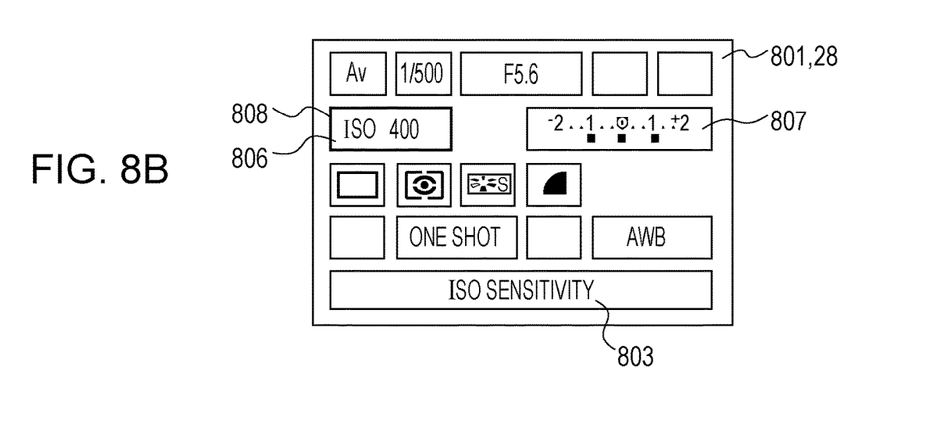
Figure 8C:
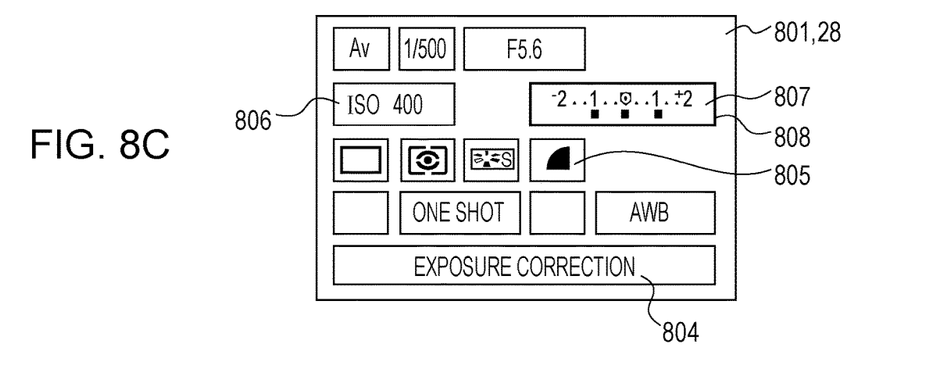

In step S702, the system control unit 50 displays a description 802 as to an item being selected for 4 seconds on the display unit 28, as in the user Q screen 801, and then displays a description of a manner of returning to a previous screen, a manner of changing a setting, or the like (not illustrated). For example, in a case where a function icon 806 is selected, a description, such as a description 803 in FIG. 8B, is displayed to inform that it is allowed to change an ISO sensitivity value. In a case where a function icon 807 is selected, a description, such as a description 804 in FIG. 8C, is displayed to inform that it is allowed to change an exposure correction value. In the user Q screen, the description about the function icon is displayed for four seconds unless another function icon is selected to provide convenience to a user who is likely to check whether a selected function icon is a correct one or not. In the Q customization, when a function icon (item) is selected, as is the case illustrated in FIG. 5B, a description is displayed for only one second so that it is allowed to quickly provide a description about an operation such as adding or deleting of an item rather than a description of a function. However, when an operation is performed to select an item with the intention of changing the setting of the item as is in the present example, the description about the item is displayed for a longer period than in the case where an item is selected with the intention of changing its location.

In step S703, the system control unit 50 determines whether the displaying of the user Q screen is to be ended or not. In a case where a command to display a playback screen or a setting screen is issued, or a command to display the menu screen is issued by pressing down the menu button 66, or a command to turn off the power of the digital camera is issued, then it is determined that the displaying of the user Q screen is to be ended. In a case where it is determined that the displaying of the user Q screen is to be ended, the displaying is ended, but otherwise the processing flow proceeds to step S704.

In step S704, the system control unit 50 determines whether or not the set button 75 is pressed down. In a case where it is determined that the set button 75 is pressed down, the processing flow proceeds to step S705, but otherwise the processing flow proceeds to step S706.

In step S705, the system control unit 50 changes the setting associated with the item being selected. For example, when the function icon 805 is selected as shown in FIG. 8A, if the set button 75 is pressed down, it becomes possible to change the setting in terms of the recording image quality indicated by the function icon 805.

In step S706, the system control unit 50 determines whether a movement operation is performed or not. In a case where it is determined that a movement operation is performed, the processing flow proceeds to step S707, but otherwise the processing flow proceeds to step S702. The manner of moving an item is similar to the manner of performing the process described above with reference to FIG. 3 or FIG. 4.

In step S707, the system control unit 50 selects an item corresponding to the movement operation performed in step S706. In a state in which a function icon 805 is selected as in FIG. 8A, if a move-to-right operation is performed, a function icon 806 is selected in the user Q screen as shown in FIG. 8B, and the function icon 806 is enclosed in an identification frame 808. That is, because the function icon 805 is located at the right end of a row in which the function icon 805 is displayed, if the move-to-right operation is performed at this location, an item located at a left end in another row is selected (that is, the selection moves from the right end to the left end). In the user Q screen, as described above, when a move-outward-from-end operation is performed, it is allowed to select an item located at an opposite end. This is because when a movement operation is performed on the user Q screen, it is intended to select an item, and, thus, it may be desirable to quickly reach a location where the intended item is located. For example, in FIGS. 8A and 8B, to select a function icon 806 when a function icon 805 is currently selected, the function icon 806 may be reached by a smaller number operation steps by performing a move-to-right operation once than by performing a move-to-left operation twice and further a move-up operation once. Therefore, in a screen (in a case) such as the user Q screen on which it is allowed to select a displayed item, a move-outward-from-end operation is accepted.

When the function icon 806 is in a selected state, if a move-to-right operation is performed, a function icon 807 is selected as illustrated in FIG. 8C. Although there is a gap (where there is no displayed item) between the function icon 806 and the function icon 807, the function icon 807 is selected because it is located directly adjacent, on the right side, to the function icon 806.

The embodiment described above provides a technique that allows it to easily perform a selection operation optimized depending on the purpose of the selection operation and what is to be selected. As described above with reference to the flow charts shown in FIG. 3 and FIG. 7, in a case where an item is to be selected, a move-outward-from-end operation is accepted so as to make it possible to quickly reach a destination item with a small number of operation steps thereby providing a user with a better convenience in selection operation. On the other hand, as described above with reference to the flow chart shown in FIG. 4, when an item is to be moved to a destination location, if a movement operation is performed at a location close to the destination location, there is a high probability that a location a user wants to select is located close to a location being currently selected. Therefore, if a one operation step causes the selection to be moved to a location very far away from a current location, the result is that the selected location is very far from the location intended to be selected, and, thus, it becomes necessary to perform an operation to return to the original location, which results in a reduction in operability. To avoid such a situation, the move-outward-from-end operation is not accepted to prevent the movement to a location very far from the intended location from occurring in response to a one-step movement operation thereby providing a better operability in selection.

That is, in a case where a box is to be selected, a selection operation is performed to reach a position where a desired box is located, and, thus, a quick movement is provided. On the other hand, in a case where an item is to be moved, a movement operation (such as a move-outward-from-end operation) is not accepted if it results in a movement to a location very far from an intended location.

In the embodiment described above, the move-outward-from-end operation is not accepted when an operation is performed in order to move an item (in order to select a location for the item). However, in a case where a move-outward-from-end operation is performed successively twice, a movement may be allowed. When a move-outward-from-end operation is performed only once, there is a high probability that the movement operation is performed unintentionally, and, thus, it may be better not to perform the movement from an end to an opposite end. However, in the case where the move-outward-from-end operation is performed successively twice, there is a high probability that the movement to the opposite end is really intended by a user, and, thus, the move-outward-from-end operation may be accepted and the movement from an end to an opposite end may be performed. More specifically, for example, in a case where a move-outward-from-end operation is performed twice in a short period, for example, in 5 seconds, it may be determined that a movement from an end to an opposite end is really intended by a user, and the movement may be performed.

In selecting an item, when an arrow key in the arrow key set 74 is pressed down successively a greater number of times than a predetermined value, it may be determined that the key operation is performed wrongly. More specifically, for example, the number of times an arrow key is pressed down is greater than a number equal to one plus one-half the number of boxes arranged in the screen in the direction indicated by the arrow key, it may be determined that the key operation is wrong, and the movement from an end to an opposite end may not be performed. For example, in the Q customization screen shown in FIG. 5A, a location that may be reached by performing a movement operation to the right (in the horizontal direction) more than four times (to move a distance corresponding to four blocks (equal to one plus one-half the number of total blocks arranged in the horizontal direction) can be reached by a smaller number of operation steps by performing a move-to-left operation once and then a move-up or move-down operation. Therefore, when a key is pressed down successively a greater number of times than a number equal to one plus one-half the number of boxes arranged in the same direction as the movement direction, the operation is regarded as being wrong, and the movement may be stopped when an end is reached without performing a further movement.

When a move-outward-from-end operation is performed, a movement in response does not necessarily need to be performed so as to move to an item at an opposite end in another row (another column) according to the embodiment described above, but a movement may be performed so as to move to an item at an opposite end in the same row (the same column).

The controlling of the electronic device may be performed by one piece of hardware or a plurality of pieces of hardware. In the latter case, the plurality of pieces of hardware may share the processes in the total control operation of the apparatus.

While the present invention has been described above with reference to exemplary embodiments, the invention is not limited to these embodiments. Note that many modifications are possible without departing from the scope of the present invention. The embodiments described above are given by way of example only, and various combinations of embodiments may be possible.

In the embodiments described above, the invention is applied, by way of example to a digital camera. However, the electronic device is not limited to the digital camera, but the invention may be applied to many other types of electronic devices configured to accept a selection operation. For example, the invention may be applied to a portable telephone terminal, a portable image viewer, a printer apparatus having a finder, a digital photo frame, a music player, a game machine, an electronic book reader, and the like.

Other Embodiments

The invention may also be realized by performing a process described below. That is, software (a program) for realizing one or more functions according to one or a combination of embodiments described above is provided to a system or an apparatus via a network or one of various kinds of storage media. A computer (or a CPU, an MPU, or the like) in the system or the apparatus reads out the program and executes it. Note that in this case, the program and the storage medium in which the program is stored fall into the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-020641, filed Feb. 4, 2015, which is hereby incorporated by reference herein in its entirety.

What is claimed is:

1. An electronic device comprising:
one or more processors; and
memory storing instructions that, when executed by the one or more processors, cause the electronic device to perform operations including:
accepting an operation, including a first movement operation, to move a selected location on a screen in which one or more items are positioned, and
performing a control operation,
wherein, in response to performing the first movement operation to move a particular item, in a case where the particular item is not located in a first direction at an end of a plurality of selectable locations, the particular item is moved in the first direction, while, in a case where the particular item is located in the first direction at the end of the plurality of selectable locations, the particular item is not moved, even if the first movement operation is performed to try to move the particular item, and
wherein, in response to performing the first movement operation to select one of a plurality of positioned items without moving any item, in a case where an item being currently selected in the first direction is not an item positioned at an end of the plurality of items, the selected item is changed from the item being currently selected to an item positioned in the first direction, while, in a case where the item being currently selected in the first direction is an item positioned at an end of the plurality of items, the selected item is changed from the item being currently selected to an item positioned in a second direction opposite to the first direction at an end of the plurality items.

2. An electronic device comprising:
one or more processors; and
memory storing instructions that, when executed by the one or more processors, cause the electronic device to perform operations including:
accepting an operation, including a first movement operation, to move a selected location on a screen in which one or more items are positioned, and
performing a control operation,
wherein, in response to performing the first movement operation to move a particular item, in a case where the particular item is not located in a first direction at an end of a plurality of selectable locations, the particular item is moved in the first direction, while, in a case where the particular item is located in the first direction at the end of the plurality of selectable locations, the particular item is not moved, even if the first movement operation is performed to try to move the particular item, and
wherein, in response to performing the first movement operation to select one of a plurality of selectable locations without moving any item, in a case where a location being currently selected is one of the plurality of selectable locations in the first direction other than the end of the plurality of selectable locations, a selected location is moved to a location in the first direction from the location being currently selected, while, in a case where the location in the first direction being currently selected is at the end of the plurality of selectable locations, the selected location is moved, in a second direction opposite to the first direction, from the location being currently selected to a location at an end of the plurality of selectable locations.

3. The electronic device according to claim 2, wherein the end in the second direction and the end in the first direction are respectively located in different columns or different rows.

4. The electronic device according to claim 2, wherein a screen that accepts the first movement operation to move a particular item and a screen that accepts the first movement operation to select an item without moving any item are different in terms of functions executed on the respective screens.

5. The electronic device according to claim 2, wherein performing a control operation includes performing control such that a cursor is displayed to indicate the particular item that is moved in response to the first movement operation.

6. The electronic device according to claim 2, wherein performing a control operation includes performing control such that an indication is displayed to indicate a direction in which the particular item is allowed to be moved in response to the first movement operation.

7. The electronic device according to claim 2, wherein the first movement operation to move the particular item is accepted in a screen which is a layout screen configured to allow a user to determine a location at which an item is displayed.

8. The electronic device according to claim 2, wherein changing a size of the particular item which is moved in response to the first movement operation is allowed.

9. The electronic device according to claim 2, wherein a delete instruction is accepted that instructs to delete an item at a location selected in response to the first movement operation without moving the item.

10. The electronic device according to claim 2,
wherein the first movement operation is a movement operation to the left,
wherein the end in the first direction is a left end, and
wherein the end in the second direction is a right end.

11. The electronic device according to claim 2,
wherein accepting includes capability of accepting a second movement operation, and
wherein, in the case where the particular item is located in the first direction at the end of the plurality of selectable locations, in response to the first movement operation to move a particular item, the particular item is not moved, even if the first movement operation is performed to try to move the particular item, while, in response to the second movement operation to move the particular item, the particular item is moved in the second direction opposite to the first direction.

12. The electronic device according to claim 2, wherein the first movement operation is an operation of pressing down a particular one of arrow keys indicating respective directions or an operation of rotating a rotary operation part in a particular direction.

13. The electronic device according to claim 2, wherein, in a case where the particular item is located in the first direction at the end of the plurality of selectable locations, in a case where the particular item has a size equal to or greater than one-half a range in which the particular item is allowed to move in response to the first movement operation, the particular item is not moved, even if the first movement operation is performed, while, in a case where the particular item has a size smaller than one-half the range in which the particular item is allowed to move in response to the first movement operation, the particular item is moved to an end in the second direction opposite to the first direction in response to performing the first movement operation.

14. The electronic device according to claim 2,
wherein, in a case where a screen has one or more items positioned therein, performing a control operation includes performing control to display a description about an existing item on a display in a case where the existing item is at a location selected in response to the first movement operation,
wherein, in a case where there is an existing item at a location selected in response to the first movement operation without moving any item, performing a control operation includes performing control to display a description about the existing item for a period longer than a period for which a description about the existing item is displayed in a case where there is an existing item at a location selected in response to the first movement operation to move a particular item.

15. A method of controlling an electronic device, the method comprising:
accepting an operation, including a first movement operation, to move a selected location on a screen in which one or more items are positioned; and
performing a control operation,
wherein, in response to performing the first movement operation to move a particular item, in a case where the particular item is not located in a first direction at an end of a plurality of selectable locations, the particular item is moved in the first direction, while, in a case where the particular item is located in the first direction at the end of the plurality of selectable locations, the particular item is not moved, even if the first movement operation is performed to try to move the particular item, and
wherein, in response to performing the first movement operation to select one of a plurality of positioned items without moving any item, in a case where an item being currently selected in the first direction is not an item positioned at an end of the plurality of items, the selected item is changed from the item being currently selected to an item positioned in the first direction, while, in a case where the item being currently selected in the first direction is an item positioned at an end of the plurality of items, the selected item is changed from the item being currently selected to an item positioned in a second direction opposite to the first direction at an end of the plurality items.

16. A non-transitory computer-readable storage medium storing a program causing a computer perform the method of controlling an electronic device according to claim 15.

17. A method of controlling an electronic device, the method comprising:
accepting an operation, including a first movement operation, to move a selected location on a screen in which one or more items are positioned; and
performing a control operation,
wherein, in response to performing the first movement operation to move a particular item, in a case where the particular item is not located in a first direction at an end of a plurality of selectable locations, the particular item is moved in the first direction, while, in a case where the particular item is located in the first direction at the end of the plurality of selectable locations, the particular item is not moved, even if the first movement operation is performed to try to move the particular item, and
wherein, in response to performing the first movement operation to select one of a plurality of selectable locations without moving any item, in a case where a location being currently selected is one of the plurality of selectable locations in the first direction other than the end of the plurality of selectable locations, a selected location is moved to a location in the first direction from the location being currently selected, while, in a case where the location in the first direction being currently selected is at the end of the plurality of selectable locations, the selected location is moved, in a second direction opposite to the first direction, from the location being currently selected to a location at an end of the plurality of selectable locations.

18. A non-transitory computer-readable storage medium storing a program causing a computer perform the method of controlling an electronic device according to claim 17.

* * * * *